US007760702B2

(12) United States Patent
Deng et al.

(10) Patent No.: US 7,760,702 B2
(45) Date of Patent: Jul. 20, 2010

(54) AUTOMATIC REPEAT REQUEST (ARQ) PROTOCOL FOR A MULTIHOP COOPERATIVE RELAY COMMUNICATION NETWORK

(75) Inventors: Shi-Qiang Deng, Hangzhou (CN); Philippe J. Sartori, Algonquin, IL (US); Shyamal Ramachandran, San Diego, CA (US)

(73) Assignee: Motorola, Inc., Schaumburg, IL (US)

( * ) Notice: Subject to any disclaimer, the term of this patent is extended or adjusted under 35 U.S.C. 154(b) by 133 days.

(21) Appl. No.: 12/202,149

(22) Filed: Aug. 29, 2008

(65) Prior Publication Data

US 2010/0054137 A1    Mar. 4, 2010

(51) Int. Cl.
*H04L 12/28* (2006.01)
(52) U.S. Cl. ...................................... 370/351
(58) Field of Classification Search .............. 370/315, 370/351, 390; 714/746, 748, 798, 799
See application file for complete search history.

(56) References Cited

U.S. PATENT DOCUMENTS 6,522,650 B1    2/2003    Yonge, III et al.

OTHER PUBLICATIONS

Peng-Yong Kong et al "An ARQ Scheme for IEEE 802.16j Multihop Relay Network"—IEEE C802.16j-06/213—IEEE 802.16 Broadband Wireless Access Working Group—Nov. 2006—6 pages.

*Primary Examiner*—Hanh Nguyen
*Assistant Examiner*—Jung Liu

(57) ABSTRACT

A method is provided for confirming whether a data unit transmitted from a base station (BS) was successfully relayed to a subscriber station via one of a plurality of relay stations in a multihop cooperative relay network. Selected ones of the relay stations are designated as: a front-linked relay station designed to only transmit a negative acknowledgement message to the BS upon receiving a data unit from the BS that is unable to be decoded and not to transmit an acknowledgement message upon receiving a data unit from the BS that is able to be decoded, and a back-linked relay station designed to only transmit a acknowledgement message to the BS upon receiving the data unit from the BS that is able to be decoded and not to transmit a negative acknowledgement message to the BS upon receiving a data unit from the BS that is unable to be decoded.

34 Claims, 11 Drawing Sheets

AUTOMATIC REPEAT REQUEST (ARQ) PROTOCOL FOR A MULTIHOP COOPERATIVE RELAY COMMUNICATION NETWORK

FIELD OF THE DISCLOSURE

The present disclosure relates generally to wireless communications and more particularly to multihop communication networks which utilize relay stations to facilitate communication between a base station and one or more nodes.

BACKGROUND

An infrastructure-based wireless network typically includes a communication network with fixed and wired gateways. Many infrastructure-based wireless networks employ a mobile unit which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, an ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multihopping") until the packets reach the destination node. As used herein, the term "multihop network" refers to any type of wireless network which employs routing protocols among nodes which are part of a network. In such situations, each intermediate node routes the packets (e.g., data and control information) to the next node along the route, until the packets reach their final destination The Institute of Electrical and Electronics Engineers (IEEE) 802.16 refers to a set of IEEE Wireless Local Area Network (WLAN) standards that govern broadband wireless access standards. IEEE 802.16 standards have been and are currently being developed by working group 16 of the IEEE Local Area Network/Metropolitan Area Network (LAN/MAN) Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA. The IEEE 802.16 *Working Group on Broadband Wireless Access Standards* aims to prepare formal specifications for the global deployment of broadband Wireless Metropolitan Area Networks. Among other things, the 802.16 standards define a point-to-multipoint (PMP) system with one hop links between a base station and a subscriber station. Such network topologies sometimes include pockets of poor coverage areas. While such coverage voids can be avoided by deploying base stations in a dense arrangement, this drastically increases both the capital expenditure (CAPEX) and operational expenditure (OPEX) for the network deployment. A cheaper solution is to deploy relay stations (also known as relays or repeaters) in the areas with poor coverage. These relay stations can repeat transmissions from the base station so that subscriber stations within communication range of a relay station can continue to communicate with the base station using high data rate links. The incorporation of relay stations in an IEEE 802.16 network transforms it into a multihop network with each node having one or more options to access a network, such as the Internet, via a base station.

For example, networks which comply with the IEEE 802.16j specifications will employ relay stations in an IEEE 802.16e network to provide for range extension and capacity improvements. Depending upon the particular network configuration, a particular subscriber station may gain network access via one or more neighbor relay stations and/or one or more neighbor base stations. In addition, relay stations themselves might have one or more available path options to connect to a particular base station. The relay stations can be implemented such that they are fixed, stationary, nomadic or mobile. The IEEE 802.16j standard requires that the air interface link between a relay station and a subscriber station appears to be exactly like the air interface between the base station and the subscriber station. From the perspective of the subscriber station any communications with the base station which are relayed through the relay station appear to be the same as if they had come directly from the base station.

Many wireless networks implement Automatic Repeat-reQuest (ARQ) methods for resolving errors that can occur during data transmission. These ARQ methods are usually implemented in the Data Link Layer or Transport Layer of the Open Systems Interconnection (OSI) model. Most ARQ methods use acknowledgment (ACK) messages, negative acknowledgement (NACK) messages and timeouts to achieve reliable data transmission. For instance, in one basic ARQ method, when a destination node receives a packet, the destination node sends an acknowledgment (ACK) message to a source node to indicate that the destination node has correctly received a data frame or packet. The ACK message allows the physical layer to know whether the data payload has been successfully delivered. Some ARQ methods also implement a Negative Acknowledgment (NACK) message that a destination node can transmit to the transmitter when the destination node has detected a problem with the data payload. In cases where the source node does not receive any response from the destination node (e.g., the destination node fails to receive anything from the source node and therefore does not transmit and ACK or NACK), the source node can assume there was a problem with the data payload (e.g., a lost packet). As such, if the source node does not receive an ACK or NACK within a certain amount of time (i.e., during a "timeout period") after it sends a data message (i.e. such as a frame/packet), then the source node will repeat or re-transmit the message and wait for an ACK. The source node typically continues to re-transmit the message until it receives an ACK message is received or a predefined number of re-transmissions is exceeded.

In a multihop network that implements relay stations, such as those described above including those that comply with IEEE 802.16j specification, it is difficult to use conventional ARQ methods. For instance, a publication entitled "An ARQ scheme for IEEE 802.16j multihop relay networks," Peng Yong Kong et al., Nov. 7, 2006, describes application of conventional ARQ methods to a multihop cooperative relay network. According to this ARQ method, when a base station transmits a data frame/packet to multiple relay stations, each of the relays stations sends ACK/NACK message to the base station. This approach can flood the air interface with ACK/NACK messages.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
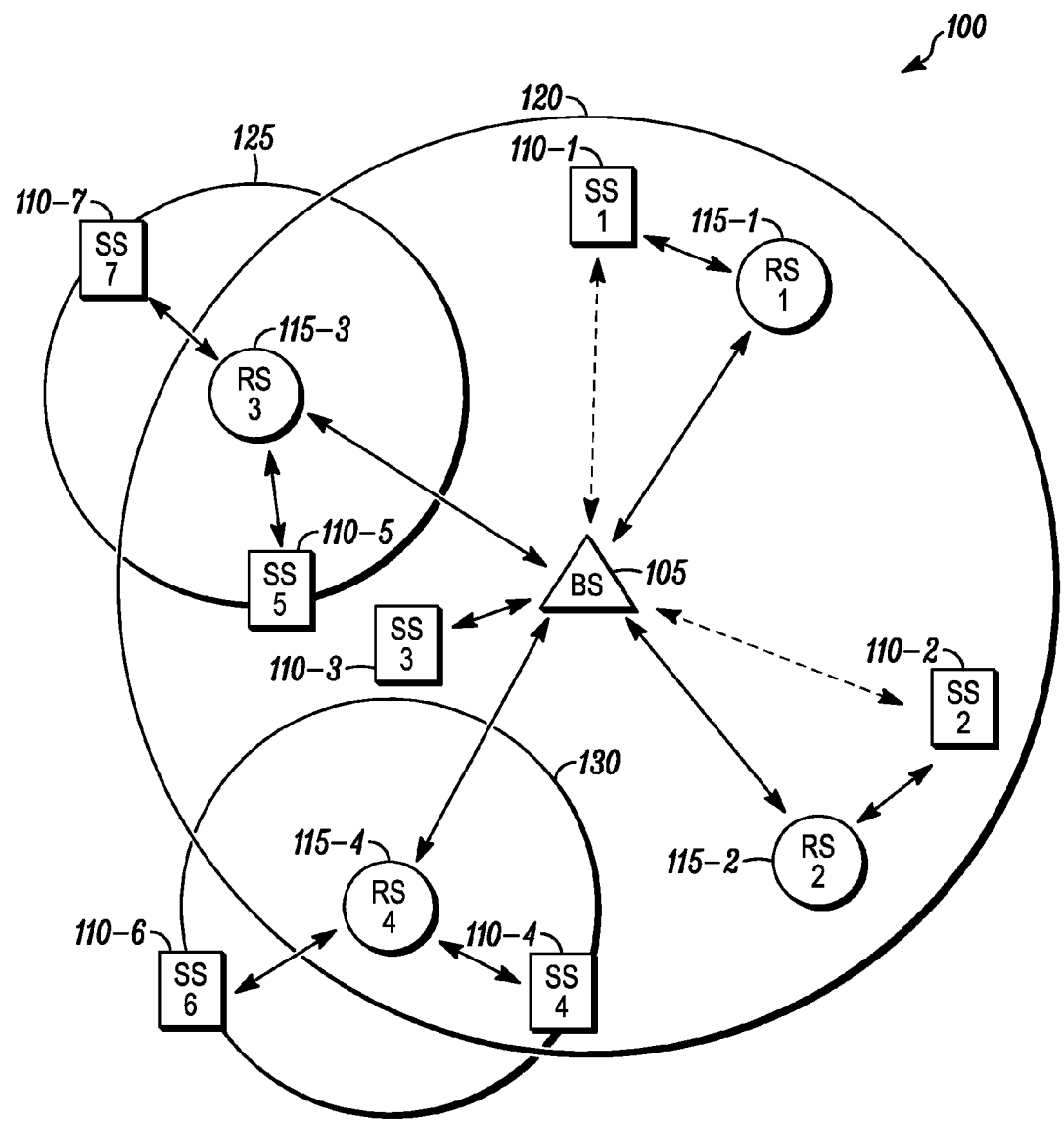
FIG. 1 illustrates a multihop cooperative relay communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

There is a need for improved ARQ methods for use in multihop cooperative relay networks. It would be desirable to provide improved ARQ methods which can ensure that at least one relay station can forward a data unit (e.g., frame, packet or other protocol data unit (PDU)) to the destination node, while also reducing the overall number of ACK/NACK messages transmitted from various relay stations to avoid flooding the air interface with ACK/NACK messages. Embodiments of the present invention address this need by providing ARQ protocols, methods and apparatus for for use in multihop cooperative relay networks.

In one implementation, an ARQ method is provided for use in a multihop cooperative relay network that includes a subscriber station, a base station that transmits a data unit destined for the subscriber station, and multiple relay stations in wireless communication pathways between the base station and the subscriber station. The ARQ method is used to confirm whether the data unit transmitted from a base station (BS) was successfully relayed to a subscriber station via at least one of a plurality of relay stations. According to this method, selected ones of the relay stations as: a front-linked relay station, a back-linked relay station, and a mean-linked relay station. The front-linked relay station is designed to only transmit a negative acknowledgement message to the BS upon receiving a data unit from the BS that is unable to be decoded and not to transmit an acknowledgement message upon receiving a data unit from the BS that is able to be decoded. The back-linked relay station is designed to only transmit a acknowledgement message to the BS upon receiving the data unit from the BS that is able to be decoded and not to transmit a negative acknowledgement message to the BS upon receiving a data unit from the BS that is unable to be decoded. The mean-linked relay station is designed to retransmit an acknowledgement message to the base station upon receiving an acknowledgement message from the subscriber station and to retransmit a negative acknowledgement message to the base station upon receiving a negative acknowledgement message from the subscriber station. Embodiments of the present invention can apply to a number of cooperative relay network configurations. Prior to describing some embodiments with reference to FIGS. 5-11, examples of such network configurations in which these embodiments can be applied will now be described with reference to FIGS. 1-4.

Network

FIG. 1 illustrates a multihop cooperative relay communication network 100. As used herein, the term "multihop cooperative relay network," refers to a communication network that uses relay stations to relay information between a base station and a subscriber station, and vice-versa, where each relay station that relays the information between the base station and subscriber station is located at a "hop" between the base station and subscriber station. In one implementation, a multihop cooperative relay network is capable of operating, for example, in compliance with the IEEE 802.16 standards. As illustrated, the network 100 includes a plurality of subscriber stations 110-n, a plurality of relay stations 115-n, and at least one base station (BS) 105. The base station (BS)

105 can communicate with plurality of subscriber stations 110-n either directly or indirectly through the relay stations 115-n.

To provide greater control over the network, many network management decisions are made at the base station (BS) 105. For example, centralized routing and scheduling algorithms can be implemented within the base station (BS) 105, and the base station (BS) 105 can be responsible for making routing decisions for the different multihop network entities. The base station (BS) 105 can also be responsible for radio frequency (RF) resource allocations (e.g., timeslots and/or frequency channels and sub-channels) to nodes (e.g., relay stations (RSs) and subscriber stations (SSs) within operating range or coverage area 120 of the base station (e.g., in the base station's "multihop cell").

The relay stations 115-n (also known as repeaters) are used to provide coverage and capacity gains by extending the base station's 105 range and permitting subscriber stations 110-n to multihop their data communications (e.g., user data and/or control information) to and from the base station (BS) 105. The relay stations 115-n can be deployed, for example, in the areas with poor coverage and repeat transmissions so that subscriber stations 110-n in a cell boundary can connect using high data rate links. In some cases relays 115-n may also serve subscriber stations 110-n that are out of the coverage range of the base station (BS) 105. In some networks, the relays 115-n are simpler versions of the base station (BS) 105, in that they do not manage connections, but only assist in relaying data. Alternatively, the relays 115-n can be at least as complex as the base station (BS) 105.

As illustrated in FIG. 1, the relay stations 115-n of the network 100 can provide communication coverage outside the base station coverage area 120. Subscriber stations SS6 110-6 and SS7 110-7 are out of the coverage range of the base station (BS) 105. Since subscriber station 6 110-6 and subscriber station 7 110-7 cannot be controlled by the base station (BS) 105 directly, they are controlled by the relay stations 115-4 and 115-3 respectively, or by the base station (BS) 105 through the relay stations 115-4 and 115-3 respectively.

For example, a relay station 3 115-3 provides a coverage area 125 and a relay station 4 115-4 provides a coverage area 130 which include communication coverage outside of a coverage area 120 of the base station (BS) 105. Thus communication by relay station 3 115-3 can include communication for subscriber station 7 110-7; and communication by relay station 4 115-4 can include communication for subscriber station 6 110-6, which otherwise would not be possible directly to the base station (BS) 105.

Figure 2:
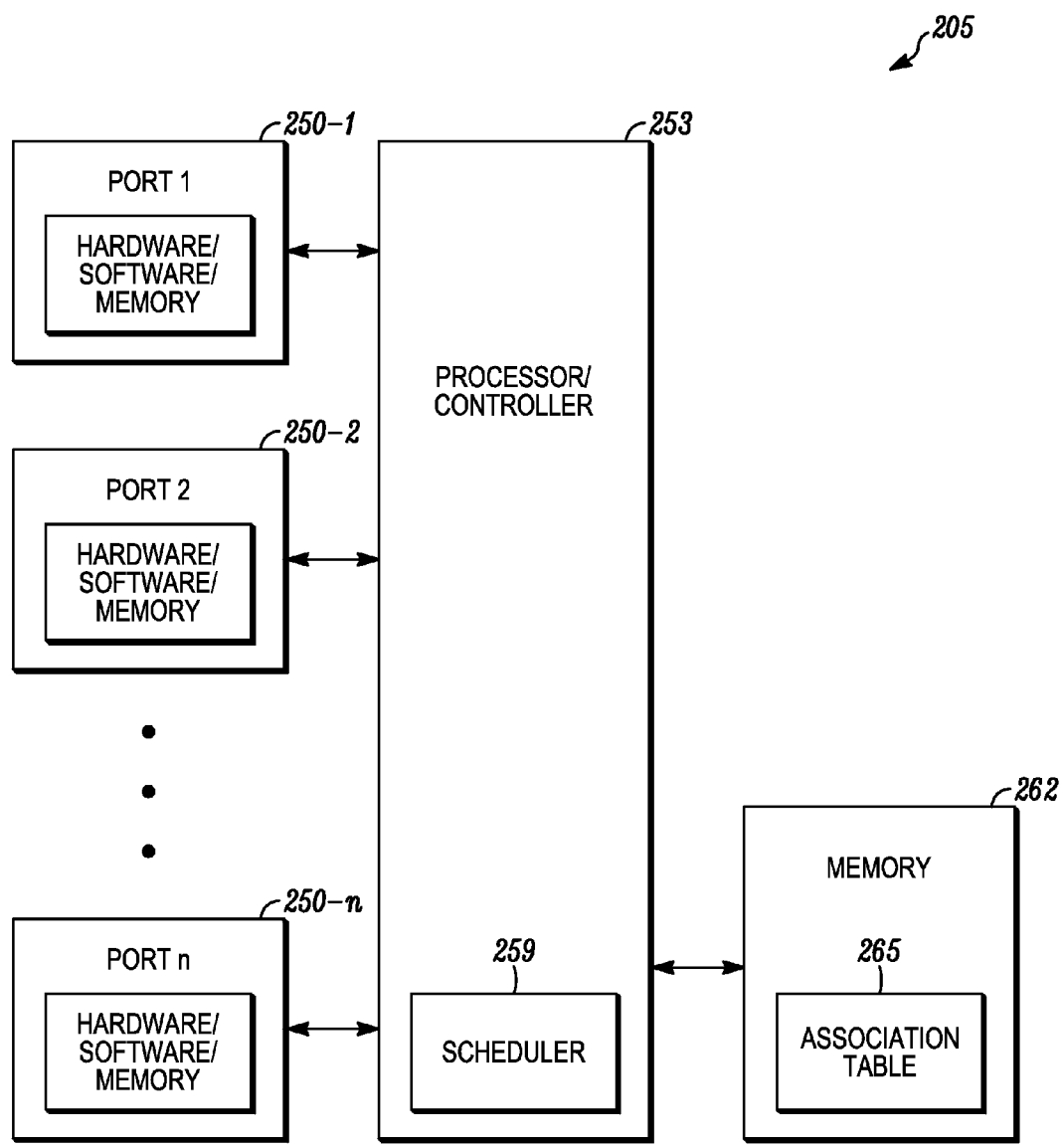
FIG. 2 illustrates a base station in accordance with some embodiments.

FIG. 2 illustrates a base station 205 in accordance with some embodiments. As illustrated, the base station 205 comprises a plurality of ports 250-n, a controller 253, and a memory 262.

Each port 250-n provides an endpoint or "channel" for network communications by the base station 205. Each port 250-n may be designated for use as, for example, an IEEE 802.16 port or a backhaul port or an alternate backhaul port. For example, the base station 205 can communicate with one or more relay stations and/or one or more subscriber stations within an 802.16 network using an IEEE 802.16 port. An IEEE 802.16 port, for example, can be used to transmit and receive both data and management information.

A backhaul port similarly can provide an endpoint or channel for backhaul communications by the base station 205. For example, the base station 205 can communicate with one or more other base stations using the backhaul, which can be wired or wireless, via the backhaul port.

Each of the ports 250-n are coupled to the controller 253 for operation of the base station 205. Each of the ports employs conventional demodulation and modulation techniques for receiving and transmitting communication signals respectively, such as packetized signals, to and from the base station 205 under the control of the controller 253. The packetized data signals can include, for example, voice, data or multimedia information, and packetized control signals, including node update information.

The controller 253 includes a scheduler block 259 for allocating RF resources (timeslots and/or frequency sub-channels) to the various relay stations 115 and subscriber stations 110. The scheduler block 259 and the parameters utilized therein can be hard coded or programmed into the base station 205 during manufacturing, can be programmed over-the-air upon customer subscription, or can be a downloadable application. Other programming methods can be utilized for programming the scheduler block 259 into the base station 205. The scheduler block 259 can be hardware circuitry within the base station. The scheduler block 259 can be contained within the controller 253 as illustrated, or alternatively can be an individual block operatively coupled to the controller 253 (not shown). As will be described below with reference to FIGS. 5 and 6, as part of an ARQ setup process in an ARQ method, the controller 253 can perform processing for designating selected ones of the various relay stations 115 as a primary front-linked relay station, a primary back-linked relay station and a primary mean-linked relay station. As will be described below with reference to FIG. 7, as part of an ARQ method, the controller 253 can perform processing of ACK/NACK messages received from the various relay stations 115 and subscriber stations 110.

To perform the necessary functions of the base station 205, the controller 253 is coupled to the memory 262, which preferably includes a random access memory (RAM), a read-only memory (ROM), an electrically erasable programmable read-only memory (EEPROM), and flash memory. The memory 262 includes storage locations for the storage of an association table 265.

The memory 262 can be integrated within the base station 205, or alternatively, can be at least partially contained within an external memory such as a memory storage device. The memory storage device, for example, can be a subscriber identification module (SIM) card.

Figure 3:
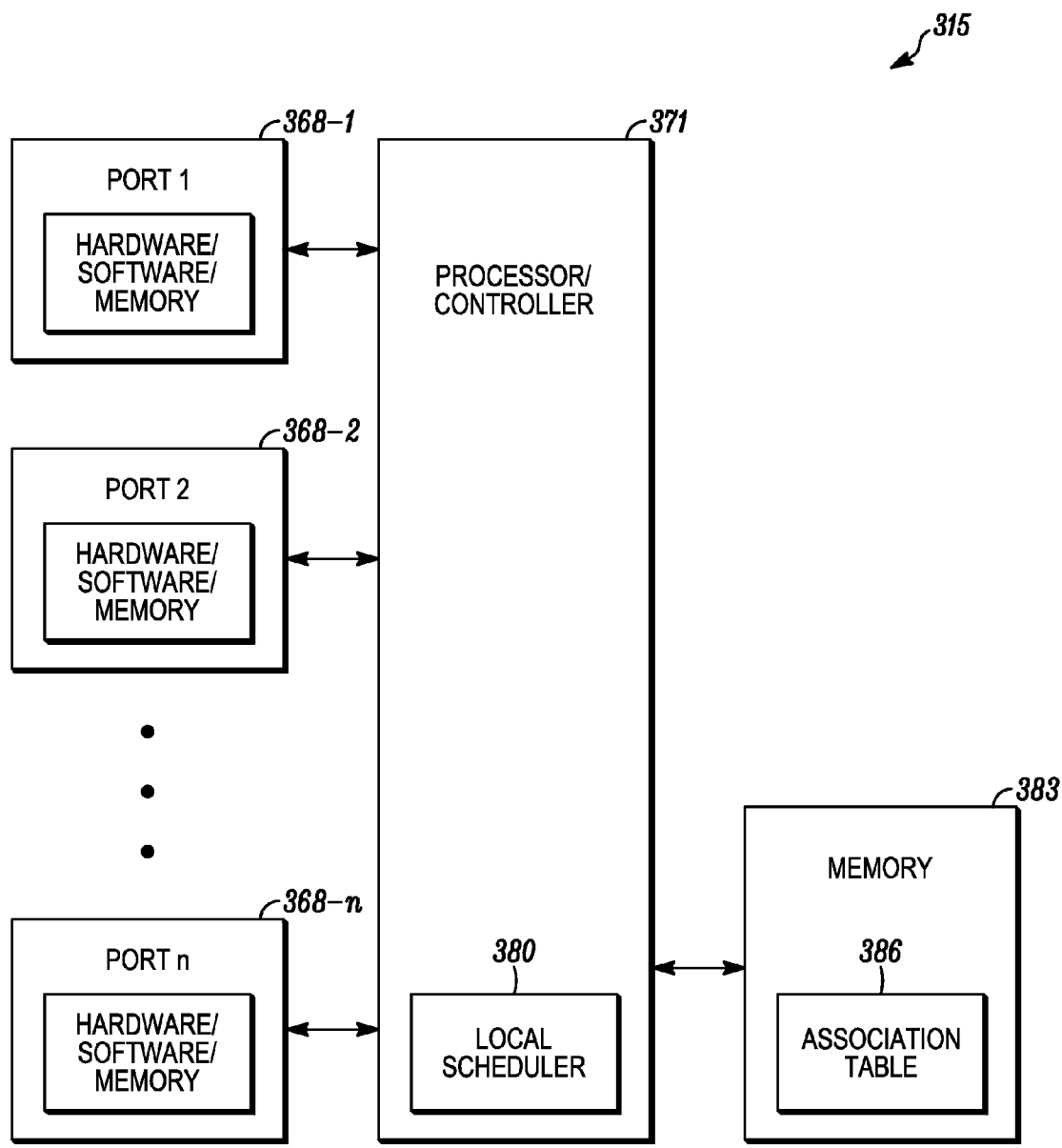
FIG. 3 illustrates a relay station in accordance with some embodiments.

FIG. 3 illustrates a relay station 315 in accordance with some embodiments. As illustrated, the relay station 315 comprises a plurality of ports 368-n. Each port 350-n may be designated for use as, for example, an IEEE 802.16 port or a backhaul port or an alternate backhaul port. For example, the plurality of ports 368-n can include an IEEE 802.16 port, which is used to communicate with one or more base stations, one or more relay stations and/or one or more subscriber stations. The relay station 315 further comprises a controller 371 and a memory 383.

An IEEE 802.16 port, for example, provides an endpoint or "channel" for 802.16 network communications by the relay station 315. For example, the relay station 315 can communicate with one or more base stations and/or one or more relay stations and/or one or more subscriber stations within an 802.16 network using the IEEE 802.16 port. An IEEE 802.16 port, for example, can be used to transmit and receive both data and management information.

Each of the ports 368-n are coupled to the controller 371 for operation of the relay station 315. Each of the ports employs conventional demodulation and modulation techniques for receiving and transmitting communication signals respectively, such as packetized signals, to and from the relay station 315 under the control of the controller 371. The packetized data signals can include, for example, voice, data or multimedia information, and packetized control signals, including node update information.

The controller 371 includes a local scheduler 380 for determining which RF resources have been allocated to the relay station 315 by the base station. The local scheduler 380 and the parameters utilized therein can be hard coded or programmed into the relay station 315 during manufacturing, can be programmed over-the-air upon customer subscription, or can be a downloadable application. Other programming methods can be utilized for programming the local scheduler 380 into the relay station 400. The local scheduler 380 can be contained within the controller 371 as illustrated, or alternatively can be individual blocks operatively coupled to the controller 371 (not shown). The operation of each of these blocks will be described herein. As will be described below with reference to FIGS. 5 and 6, as part of an ARQ setup process in an ARQ method, the controller 371 can perform processing during the process of designating selected ones of the various relay stations 115 as a primary front-linked relay station, a primary back-linked relay station and a primary mean-linked relay station. As will be described below with reference to FIGS. 8-11, as part of an ARQ method, the controller 271 can perform processing to determine whether or not to send the base station ACK/NACK messages.

To perform the necessary functions of the relay station 315, the controller 371 and the local scheduler 380 are each coupled to the memory 383, which preferably includes a random access memory (RAM), a read-only memory (ROM), an electrically erasable programmable read-only memory (EEPROM), and flash memory. The memory 383 includes storage locations for the storage of a neighbor table 386.

The memory 383 can be integrated within the relay station 315, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the relay station 315.

In typical systems such as the network 100, IEEE 802.16 relay station can forward traffic to base stations, relay stations, or subscriber stations. As previously mentioned, the relay stations are themselves managed/controlled by at least one of the base stations. Further relay stations can be fixed, nomadic or mobile.

Referring again to FIG. 1, the links shown using a dotted line double-headed arrow (e.g., the links between the base station (BS) 105 and subscriber stations 110-1, 110-2) represent links characterized by a low Carrier Interference-to-Noise Ratio (CINR), whereas all other links shown using a solid line double-headed arrow represent links characterized by a high Carrier Interference-to-Noise Ratio (CINR).

The high Carrier Interference-to-Noise Ratio (CINR) links shown as solid lines, for example, between the base station (BS) 105 and the relays stations 115-1, 115-2 and between the relays stations 115-1, 115-2 and the subscriber stations 110-1, 110-2, support relatively high data rates and are suited for communicating user data and/or control information. For example, the base station (BS) 105 directly serves SS3 110-3, and relay stations RS1-RS3 via high CINR links. In addition, the relay station 115-3 directly serves subscriber stations SS5 110-5 and SS7 110-7 via high CINR links (shown with solid-line arrows), and the relay station 115-4 serves subscriber stations 110-4 and 110-6 via high CINR links (also shown with solid-line arrows). As used herein, the term "user data" can refer to, for example, data generated by applications, a network management entity, or any other higher-layer or peer-layer protocol entities that may use the IEEE 802.16 Media Access Control (MAC) layer to transfer information. Examples of user data include, for example, packets generated by voice, video, e-mail, file transfer applications and network management agents. As used herein, the term "control information" can refer to, for example, messages and signaling used by the IEEE 802.16 MAC layer and physical (PHY) layer to carry out its own protocol functionality. Control information includes periodic control information and aperiodic control information. As used herein, the term "periodic control information" can refer to, for example, preambles, midables, synchronization sequences, timing and frequency correction channels or any other signaling used to ensure correct reception of the messages transmitted in a frame. Examples of periodic control information include, for example, frame control information such as a frame control header (FCH), a synchronization channel, preamble information, information regarding the frame structure, markers which flag the start of the frame, a downlink MAP (DL-MAP) message and other types of control information. As used herein, the term "aperiodic control information" can refer to, for example, messages transmitted aperiodically to ensure proper protocol behavior and station upkeep. Examples of aperiodic control information include, for example, management and control information, such as capability announcements, ranging messages, measurement reports, and handoff instructions.

The base station (BS) 105 maintains low CINR links (shown with dotted-line double-headed arrows) to the subscriber stations (SS1) 110-1, (SS2) 110-2. The low Carrier Interference-to-Noise Ratio (CINR) links shown using dotted line double-headed arrows, for example, between the base station (BS) 105 and the subscriber stations (SS1) 110-1, (SS2) 110-2 support relatively low data rates and are better suited for communicating control information between the base station (BS) 105 to the subscriber stations 110-1, 110-2. Although user data can be communicated over the low CINR link, transmitting user data over the low CINR links can be inefficient since the data rate on such links is relatively low in comparison to the data rates supported by the high CINR links.

Depending on what coverage footprint a particular relay station is expected to serve, the particular relay station may or may not need to relay or retransmit control information it receives from the base station (BS) 105. For instance, with respect to the network shown in FIG. 1, relay station (RS3) 115-3 and relay station (RS4) 115-4 need to transmit downlink control information to their associated nodes which are outside the coverage area of base station (BS) 105 and cannot communicate directly with the base station (BS) 105. For example, relay station (RS3) 115-3 and relay station (RS4) 115-4 serve subscriber stations SS7 110-7 and SS6 110-6 which are outside the communication range of base station (BS) 105. By contrast, relay station (RS1) 115-1 and relay station (RS2) 115-2 need not relay or retransmit downlink control information since each of the subscriber stations SS1 110-1 and SS2 110-2 associated with those relay stations are within the coverage area of base station (BS) 105 and can communicate directly with the base station (BS) 105.

Besides relaying or retransmitting control information, relay station (RS3) 115-3 and relay station (RS4) 115-4 also relay or repeat any instructions/control/management messages that the base station (BS) 105 might send to subscriber stations (SS4, SS7) 110-4 and 110-7 being served by the relay stations (RS3) 115-3, (RS4) 115-4. The base station (BS) 105 may opt to send such messages directly to subscriber stations SS1 110-1 and SS2 110-2 using lower modulation and coding scheme (MCS) and rely on relay station (RS1) 115-1 and relay station (RS2) 115-2 to relay user data using a higher MCS. In such "transparent relay" scenarios, subscriber stations SS1 110-1 and SS2 110-2 may not even be aware of the presence of relay stations or the services they provide.

Figure 4:
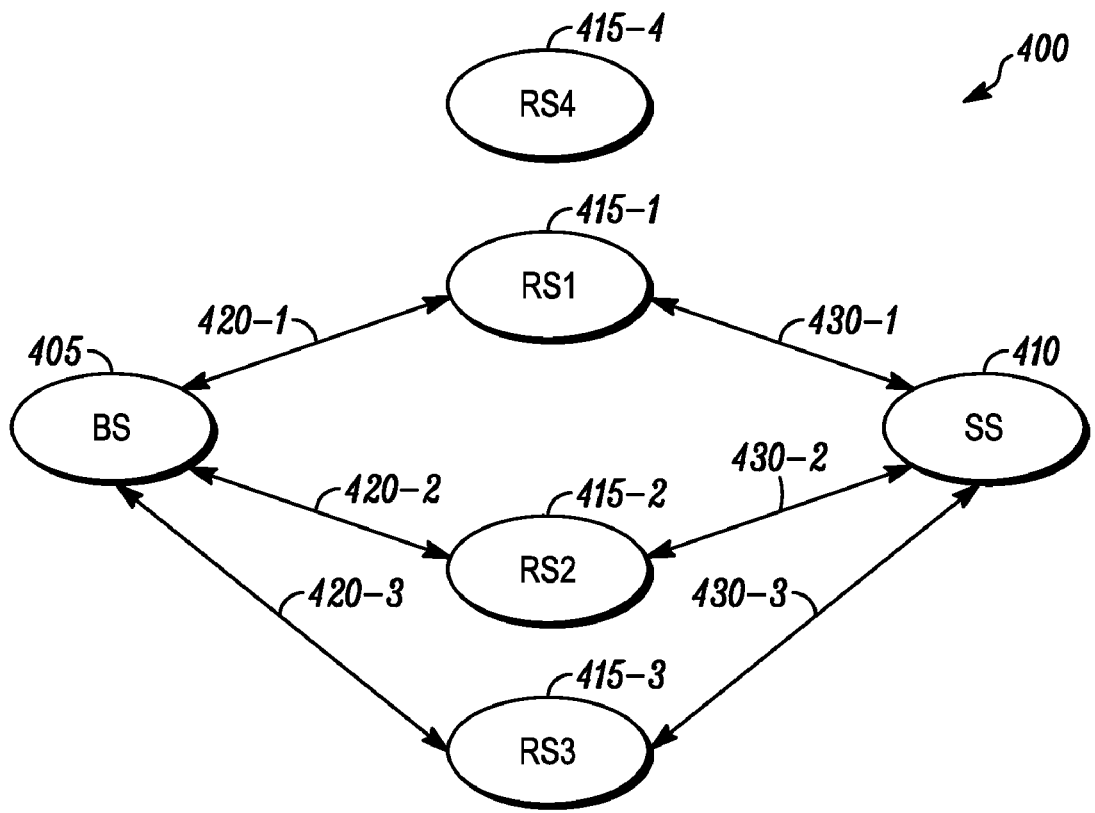
FIG. 4 illustrates a multihop cooperative relay communication network.

FIG. 4 illustrates a multihop cooperative relay communication network 400. As shown in FIG. 4, the multihop cooperative relay network 400 includes one base station (BS) 405, one subscriber station (SS) 410, four relay stations (RS1, RS2, RS3, RS4) 415-1, 415-2, 415-3, 415-4. Each relay station communicates with the base station over a "front" link between that relay station and the base station, and each relay station communicates with the subscriber station over a "back" link between that relay station and the subscriber station. For example, in FIG. 4, three of the relay stations (RS1, RS2, RS3) 415-1, 415-2, 415-3 can currently receive a data unit from the base station (BS) 405 over a front link 420-1, 420-2, 420-3, and relay the data unit to the subscriber station (SS) 410 over a respective back link 430-1, 430-2, 430-3. As used herein, the term "front link" describes a bi-directional communication link or channel between the base station (BS) 405 and a relay station; the front link includes an uplink (UL) portion for communications from a relay station to the base station (BS) 405 and a downlink (DL) portion for communications from the base station (BS) 405 to a relay station. As used herein, the term "back link" described a bi-directional communication link or channel between any relay station and the subscriber station (SS) 410; the back link includes an uplink (UL) portion for communications from a subscriber station (SS) 410 to a relay station and a downlink (DL) portion for communications from a relay station to the subscriber station (SS) 410.

Figure 5:
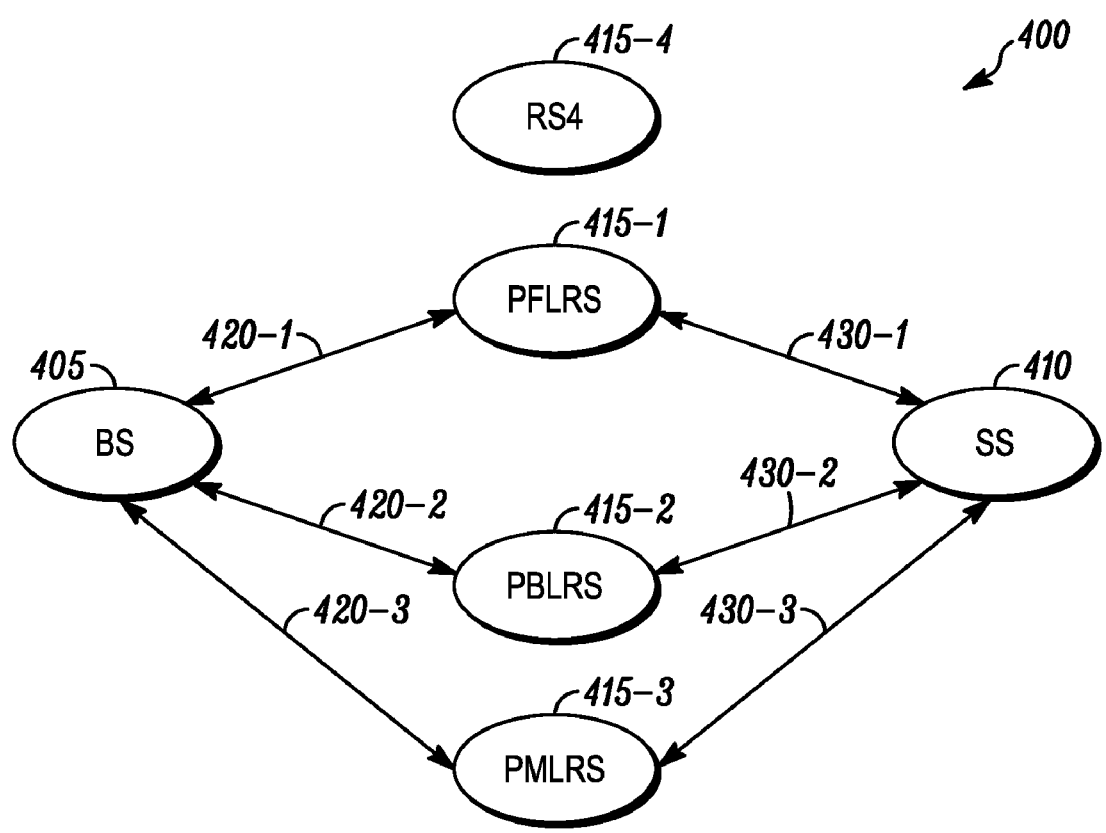
FIG. 5 illustrates the multihop cooperative relay communication network of FIG. 4 after relay stations have been designated as a primary front-linked relay station, a primary back-linked relay station and a primary mean-linked relay station.

FIG. 5 illustrates the multihop cooperative relay communication network 400 of FIG. 4 after relay stations 415-1, 415-2, 415-3 have been designated as a primary front-linked relay station 415-1, a primary back-linked relay station 415-2 and a primary mean-linked relay station 415-3. The BS 405 can use many different techniques to designate a primary front-linked relay station 415-1, primary back-linked relay station 415-2 and primary mean-linked relay station 415-3.

In one implementation, the base station (BS) 405 is provided with a front link metric associated with each of the relay stations, determines which relay station has a highest front link metric with the base station (BS) 405; and designates the one of the relay stations that has the highest front link metric with the base station (BS) 405 as the front-linked relay station. As used herein, the term "highest" refers the metric that is indicative of the highest channel capacity and/or quality. Therefore, is term "highest" is used in a relative sense to refer to the particular metric of a set of metrics that is the "best" or "most optimum" in terms of channel capacity and/or quality, and depending on the particular metric under consideration the term "highest" can refer to a highest or lowest value of the particular metric under consideration. The base station (BS) 405 is provided with a back link metric associated with each of the relay stations, determines which relay station has a highest back link metric with the subscriber station (SS) 410, and designates the one of the relay stations that has the highest back link metric as the back-linked relay station. The base station (BS) 405 can also determine a mean link metric for each of the relay stations based on a front link metric associated with that relay station and a back link metric associated with that relay station, determine which relay station has a highest mean link metric, and designate the one of the relay stations that has the highest mean link metric as a mean-linked relay station.

In another implementation, the designations can be made by pseudo-randomly selecting the primary front-linked relay station, the primary back-linked relay station and the primary mean-linked relay station from a set of relay stations that meet certain threshold criteria. For example, in one implementation, the base station (BS) 405 determines a first group of relay stations having one or more front link capacity and/or quality metrics that exceed a first threshold, and pseudo-randomly designates a selected one of the first group of relay stations as the primary front-linked relay station (PFLRS) 415-1. The base station (BS) 405 also determines a second group of relay stations having one or more back link capacity and/or quality metrics that exceed a second threshold, and pseudo-randomly designates a selected one of the second group of relay stations as the primary back-linked relay station (PBLRS) 415-2. The base station (BS) 405 also pseudo-randomly designates a selected one of the first group of relay stations and the second group of relay stations as the primary mean-linked relay station (PMLRS) 415-3.

In yet other implementations, the primary front-linked relay station 415-1 is the relay station that has the "best" front link with the base station (BS) 405, the primary back-linked relay station 415-2 is the relay station that has the "best" back link with the subscriber station (SS) 410, and primary mean-linked relay station 415-3 is the relay station that has the "best" combination or average of the front link with the base station (BS) 405 and back link with the subscriber station (SS) 410. The term "best" refers to the link that exhibits the highest channel capacity and/or quality. In such embodiments the highest channel quality and/or highest channel capacity can be determined using any known link or communication performance metric (or combination of known link or communication performance metrics). The link metrics which can be used to make this designation can include any one of, or any combination of, the data rate on each link, the amount of bandwidth allocated to each link, the modulation and coding scheme used on each link, and other link metrics (LMs) which can provide indicia of link quality and capacity between two stations. Each of the front link metrics may comprise one or more front link capacity metrics, one or more front link quality metrics, or a combination of one or more front link capacity metrics and one or more front link quality metrics. Similarly, each of the back link metrics may comprise one or more back link capacity metrics, one or more back link quality metrics, or a combination of one or more back link capacity metrics and one or more back link quality metrics. The LMs can generally include any known Link Quality Metrics (LQMs) and/or Link Capacity Metrics (LCMs).

LQMs can include any metrics which reflect channel or link quality between two stations. The LQMs can be made during the reception, demodulation, and/or decoding of a packet. Examples of LQMs include received signal strength indicator (RSSI) values, and received sensitivity (RS) values (e.g., the lowest level signal strength at which a packet can be successfully recovered such that any packet received with a value less than a threshold RS value will be viewed as noise).

LCMs can include any metrics which reflect channel or link capacity between two stations. For example, the LCMs can include bandwidth allocated to each link, modulation and coding scheme used on each link, a packet error rate (PER) estimate or a bit-error rate (BER) estimate, the number of multipath signals present during demodulation, a post-detection signal quality (PDSQ) value, and an analog gain control (AGC) output.

Depending on the specific implementation, the LMs can include, for example: a ratio of a period during which a channel is sensed as being busy with respect to an overall measurement period; a difference between inbound data rate of a given data flow and outbound data rate of the given data flow; a packet queuing delay; a transmitted power level (TPL) at which the respective data packets were transmitted by stations over the respective links (e.g., the power level at which stations finds it necessary to transmit a data-packet over the link); an average of a number of retransmissions per packet (e.g., how many packets are transmitted with up to a pre-defined number of retransmissions); a percentile of the number of retransmissions per packet (e.g., how many packets are transmitted with up to a pre-defined number of retransmissions); packet error rate (PER) or average packet error rate (PER); received signal strength indicators (RSSIs); carrier-to-noise ratio (CNR); carrier-to-noise-and-interference ratio (CNIR); signal-to-noise ratio (SNR) of the received signal (usually measured in terms of $E_b/N_0$, which stands for energy per bit divided by the one-sided noise density) or an average thereof; signal-to-interference ratios (SIRs) (also referred to as carrier-to-interference ratio (CIR), where the SIR/CIR is the quotient between the average received modulated carrier power S or C and the average received co-channel interference power I); signal-to-interference-plus-Noise Ratio (SINR) in previous packets successfully received; and the product PER×SINR or an average thereof. The SIR/CIR resembles the carrier-to-noise ratio (CNR), which is the signal-to-noise ratio (SNR) of a modulated signal before demodulation.

To illustrate one example of how the designations in FIG. 5 can be made, an example will now be described with reference to FIG. 6, where a link capacity and/or quality metric of various front links 420 and back links 430 is used to designate particular relay stations as the primary front-linked relay station, the primary back-linked relay station and the primary mean-linked relay station. However, it is emphasized the particular technique used to designate the primary front-linked relay station, the primary back-linked relay station and the primary mean-linked relay station are not limited to the particular implementation described in conjunction with FIG. 6. Rather, FIG. 6 illustrates just one particular method that can be used to designate the primary front-linked relay station, the primary back-linked relay station and the primary mean-linked relay station.

Figure 6:
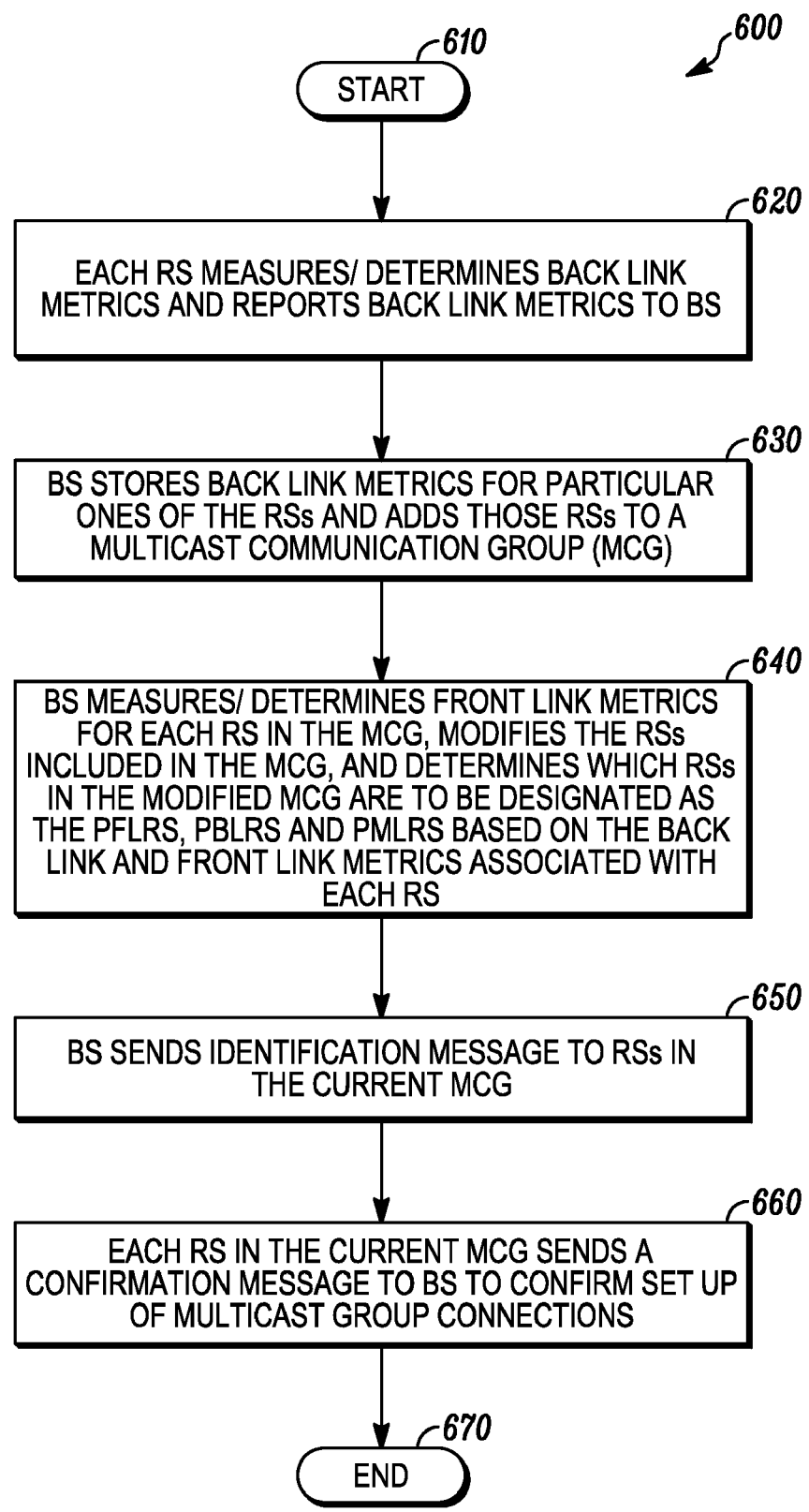
FIG. 6 is flow chart illustrating an ARQ setup method for designating particular ones of the relay stations of the multihop cooperative relay network as a primary front-linked relay station, primary back-linked relay station and primary mean-linked relay station in accordance with some embodiments.

FIG. 6 is flow chart illustrating an ARQ setup method 600 for designating particular ones of the relay stations 415-1, 415-2, 415-3 of the multihop cooperative relay network 400 as a primary front-linked relay station 415-1, primary back-linked relay station 415-2 and primary mean-linked relay station 415-3 in accordance with some embodiments.

Method 600 starts at step 610. At step 620, each of the relay stations 415-1, 415-2, 415-3, 415-4 measures a link capacity and/or quality metric of its respective back link 430-1, 430-2, 430-3 to the subscriber station (SS) 410, determines if the measured link capacity and/or quality metric is above a threshold (T1), and if so, reports the measured link capacity and/or quality metric to the base station (BS) 405.

At step 630, the base station (BS) 405 receives the measured back link capacity and/or quality metrics (from each relay station having a measured back link capacity and/or quality metric that exceeds the threshold (T1)), and adds those relay stations to a multicast candidate group list.

At step 640, the base station (BS) 405 measures front link capacity and/or quality metrics for each relay station in the multicast candidate group (MCG) list. The base station (BS) 405 then determines which of the measured front link capacity and/or quality metrics are below a second threshold (T2) and removes any relay stations having measured front link capacity and/or quality metrics below the second threshold (T2) from the MCG list. In addition, at step 640, for each relay station that remains in the MCG list, the base station (BS) 405 then uses the stored back link capacity and/or quality metrics and front link capacity and/or quality metrics (for each relay station that remains on the MCG) to determine selected ones of the relay stations in the MCG that are to be designated as the primary front-linked relay station, the primary back-linked relay station and the primary mean-linked relay station.

For instance, in one implementation, the base station (BS) 405 determines which relay station (from those remaining on the MCG list) has the highest front link capacity and/or quality metric, which relay station (from those remaining on the MCG list) has the highest back link capacity and/or quality metric, and which relay station (from those remaining on the MCG list) has the highest average or mean capacity and/or quality metrics (i.e., average or mean of the front link capacity and/or quality metric and the back link capacity and/or quality metric. In one implementation, the highest average or mean capacity and/or quality metric can be determined by taking the product of the front link capacity and/or quality metric and the back link capacity and/or quality metric for a particular relay station, and then dividing the product by the sum of the front link capacity and/or quality metric and the back link capacity and/or quality metric for the particular relay station.

The base station (BS) 405 designates the relay station having the highest front link capacity and/or quality metric as the primary front-linked relay station, and designates the relay station having the highest back link capacity and/or quality metric as the the primary back-linked relay station. The base station (BS) 405 designates the relay station having the highest average capacity and/or quality metric as the the primary mean-linked relay station.

For purposes of discussion that follows and to be consistent with the designations indicated in FIG. 5, it will be assumed that the base station (BS) 405 determines that relay station (RS1) 415-1 has the highest front link capacity and/or quality metric and is therefore designated as the primary front-linked relay station (PFLRS) 415-1. Further, it will be assumed that the base station (BS) 405 determines that the relay station (RS2) 415-2 has the highest back link capacity and/or quality metric and is therefore designated as the primary back-linked relay station (PBLRS) 415-2, and that relay station (RS2) 415-3 has the highest average capacity and/or quality metrics (over front and back links) and is therefore designated as the primary mean-linked relay station (PMLRS) 415-3.

At step 650, the base station (BS) 405 sends an identification message to the relay stations that remain in the MCG list. The identification message can include, for example, (1) a connection identifier that identifies a multicast connection between RS-BS, (2) a connection identifier that identifiers connection between the base station (BS) 405 and the subscriber station (SS) 410, and (3) identifiers that identify the primary front-linked relay station (PFLRS) 415-1, the primary back-linked relay station (PBLRS) 415-2, and the primary mean-linked relay station (PMLRS) 415-3.

At step 660, each of the relay stations that receive the identification message respond by sending a confirmation message to the base station (BS) 405 to confirm setup of this multicast connection. Method 600 then ends at step 670.

One reason it is important to designate the primary front-linked relay station (PFLRS) 415-1, the primary back-linked relay station (PBLRS) 415-2, and the primary mean-linked relay station (PMLRS) 415-3 is because each of these different types of relay stations has a different role in the ARQ methods that will now be described below. For example, as will be described in more detail below with reference to FIGS. 7-11, in the ARQ method the primary front-linked relay station 415-1 only transmits negative acknowledgement messages (R-NACKs) to the base station (BS) 405, and the primary back-linked relay station 415-2 only transmits acknowledgement messages (R-ACKs) to the base station (BS) 405. The acronyms R-ACK and R-NACK are used to distinguish the ACK and NACK messages transmitted from the primary front-linked relay station 415-1 and the primary back-linked relay station 415-2, respectively. The primary mean-linked relay station 415-3, upon receiving an ACK message or a NACK message from the subscriber station (SS) 410, re-transmits the ACK message or the NACK message to the base station (BS) 405 as either an acknowledgement message (M-ACK) or a negative acknowledgement message (M-NACK), respectively. The acronyms M-ACK and M-NACK are used to distinguish the ACK and NACK messages transmitted by the primary mean-linked relay station 415-3 from the R-ACK and R-NACK messages transmitted from the primary front-linked relay station 415-1 and the primary back-linked relay station 415-2, respectively. All other relay stations do not participate in the ARQ method (i.e., do not transmit ACK messages or NACK messages) to the base station (BS) 405. As such, the overall amount of ACK/NACK traffic is greatly reduced. An ARQ method for use in a multihop cooperative relay communication network 400 will now be described with reference to FIGS. 7-11. Although the network illustrated in FIG. 5 illustrates a single subscriber station for simplicity of illustration, it is noted that in other network configurations more than one subscriber station can be communicating with the base station at any particular time in which case the methods 700-1100 that are illustrated in FIGS. 7-11 can be performed concurrently for multiple subscriber stations.

Figure 7:
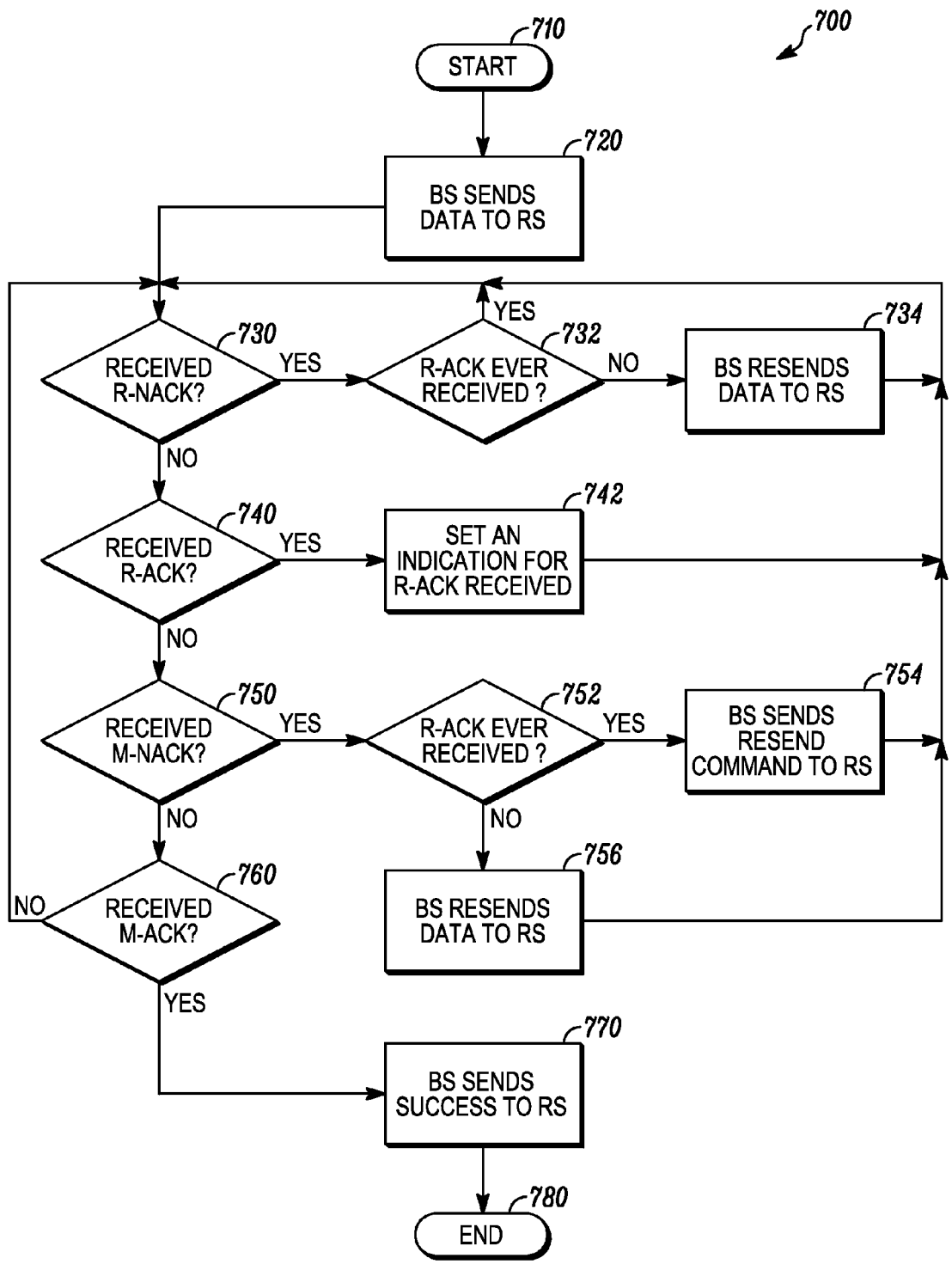
FIG. 7 is flow chart illustrating a method performed at a base station during an ARQ method in accordance with some embodiments.

FIG. 7 is flow chart illustrating a method 700 performed at a base station (BS) 405 during an ARQ method in accordance with some embodiments.

The method starts at step 710. At step 720, the base station (BS) 405 sends a data unit to all relay stations 415-1, 415-2, 415-3, 415-4 in the MCG. The data unit can be a group of bits, a data frame, a data packet or other a protocol data unit (PDU).

At step 730, the base station (BS) 405 determines if the base station (BS) 405 received a new R-NACK from the primary front-linked relay station (PFLRS) 415-1. If so, then the method 700 proceeds to step 732. If not, then the method 700 proceeds to step 740. At step 732, the base station (BS) 405 determines if the base station (BS) 405 has ever received a R-ACK message from the primary back-linked relay station (PBLRS) 415-2. If not, then the method 700 loops back to step 730. If so, then the method 700 proceeds to step 734, where the base station (BS) 405 resends or retransmits the data unit to all relays stations in the MCG 415-1, 415-2, 415-3 and the method 700 then loops back to step 730. At step 740, the base station (BS) 405 determines if it has received a new R-ACK message from the primary back-linked relay station (PBLRS) 415-2. If so, the method 700 proceeds to step 742. If not, then the method 700 proceeds to step 750.

At step 742, the base station (BS) 405 sets an indication that it has received an R-ACK message from the primary back-linked relay station (PBLRS) 415-2. The method 700 then loops back to step 730.

At step 750, the base station (BS) 405 determines if it has received a new M-NACK message from the primary mean-linked relay station (PMLRS) 415-3. If so, the method 700 proceeds to step 752. If not, the method 700 proceeds to step 760.

At step 752, the base station (BS) 405 determines if it has ever received a R-ACK message from the primary back-linked relay station (PBLRS) 415-2. If so, the method 700 proceeds to step 754. If not, the method 700 proceeds to step 756.

At step 754, the base station (BS) 405 sends a resend command message to all relay stations in MCG. The resend command message commands the recipient relay stations to resend the data unit to the subscriber station (SS) 410. The base station (BS) 405 sends the resend command message to the relay stations when it determines that the data unit needs to be resent to the subscriber station (SS) 410. To explain further, when the base station (BS) 405 receives an acknowledgment message (R-ACK) from the back-linked relay station (PBLRS) 415-2 at step 752, the base station (BS) 405 knows that at least the back-linked relay station (PBLRS) 415-2 has received the data unit correctly. At the same time, because a negative acknowledgment message (M-NACK) was received from the primary mean-linked relay station (PMLRS) 415-3 at step 750, the base station (BS) 405 knows that the subscriber station (SS) 410 has not received this data unit correctly. As such, the base station (BS) 405 only needs to send the resend command message to relay stations, and does not need to resend the data unit again. Any relay stations that did not receive the data unit correctly will ignore the resend command message since they have nothing to resend. The method 700 then loops back to step 730.

At step 756, the base station (BS) 405 resends the data unit to all relay stations in MCG. The method 700 then loops back to step 730.

At step 760, the base station (BS) 405 determines if the base station (BS) 405 received an M-ACK message from the primary mean-linked relay station (PMLRS) 415-3, and if so, the method 700 proceeds to step 770. If not, then the method 700 loops back to step 730.

At step 770, the base station (BS) 405 send a success message to the relay stations in the MCG to indicate that the data unit was successfully transmitted to the subscriber station (SS) 410. To explain further, the base station (BS) 405 sends the success message to the relay stations when the base station (BS) 405 has confirmed that the subscriber station (SS) 410 has received the data unit so that the relay stations know that the data unit has been successfully received by the subscriber station (SS) 410 and so that the relay stations know that the data unit can be removed from their buffers. At step 780, the method 700 ends for this data unit.

Figure 8:
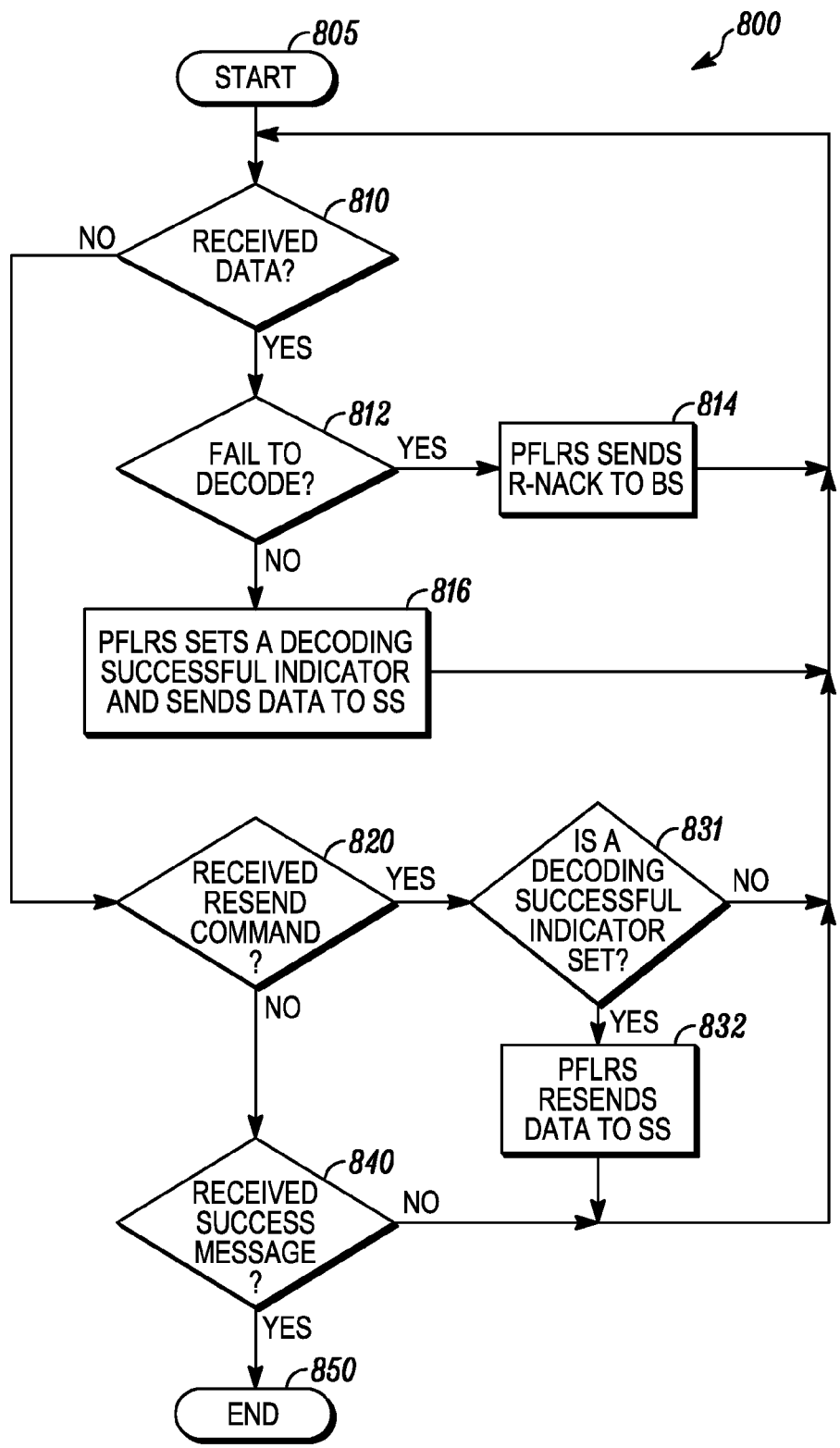
FIG. 8 is flow chart illustrating a method performed at a primary front-linked relay station during an ARQ method in accordance with some embodiments.

FIG. 8 is flow chart illustrating a method 800 performed at a primary front-linked relay station (PFLRS) 415-1 during an ARQ method in accordance with some embodiments.

Method 800 starts at step 805. At step 810, the primary front-linked relay station (PFLRS) 415-1 determines if it received a new data unit from the base station (BS) 405. If so, the method 800 proceeds to step 812. If not, then the method 800 proceeds to step 820.

At step 812, the primary front-linked relay station (PFLRS) 415-1 determines if it can successfully process (e.g., decode) this data unit. If not, the method 800 proceeds to step 814. If so, then the method 800 proceeds to step 816.

At step 814, the primary front-linked relay station (PFLRS) 415-1 sends an R-NACK message to the base station (BS) 405 to indicate that the primary front-linked relay station (PFLRS) 415-1 could not successfully process (e.g., decode) this data unit. The method 800 then loops back to step 810.

At step 816, the primary front-linked relay station (PFLRS) 415-1 sets an indicator that indicates that the primary front-linked relay station (PFLRS) 415-1 has successfully decoded the data unit and relays the data unit to the subscriber station (SS) 410, and the method 800 then loops back to step 810.

At step 820, the primary front-linked relay station (PFLRS) 415-1 determines if it received a resend command message from the base station (BS) 405 that indicates that the data unit is to be resent by the primary front-linked relay station (PFLRS) 415-1. If the primary front-linked relay station (PFLRS) 415-1 did not receive a resend command message from the base station (BS) 405, then the method 800 proceeds to step 840. If the primary front-linked relay station (PFLRS) 415-1 did receive a resend command message from the base station (BS) 405, the method 800 proceeds to step 831, where the primary front-linked relay station (PFLRS) 415-1 determines whether an indicator is set at the primary front-linked relay station (PFLRS) 415-1 that indicates that the primary front-linked relay station (PFLRS) 415-1 has successfully decoded the data unit. If not, then the method 800 loops back to step 810. If so, the method 800 proceeds to step 832.

At step 832, the primary front-linked relay station (PFLRS) 415-1 resends the data unit to the subscriber station (SS) 410, and the method 800 then loops back to step 810.

At step 840, the primary front-linked relay station (PFLRS) 415-1 determines if it received a success message from the base station (BS) 405 confirming that the data unit was successfully transmitted to and received by the subscriber station (SS) 410. If so, the primary front-linked relay station (PFLRS) 415-1 is finished sending this data unit to the subscriber station (SS) 410 and the method 800 ends at step 850. If not, then the method 800 loops back to step 810.

Figure 9:
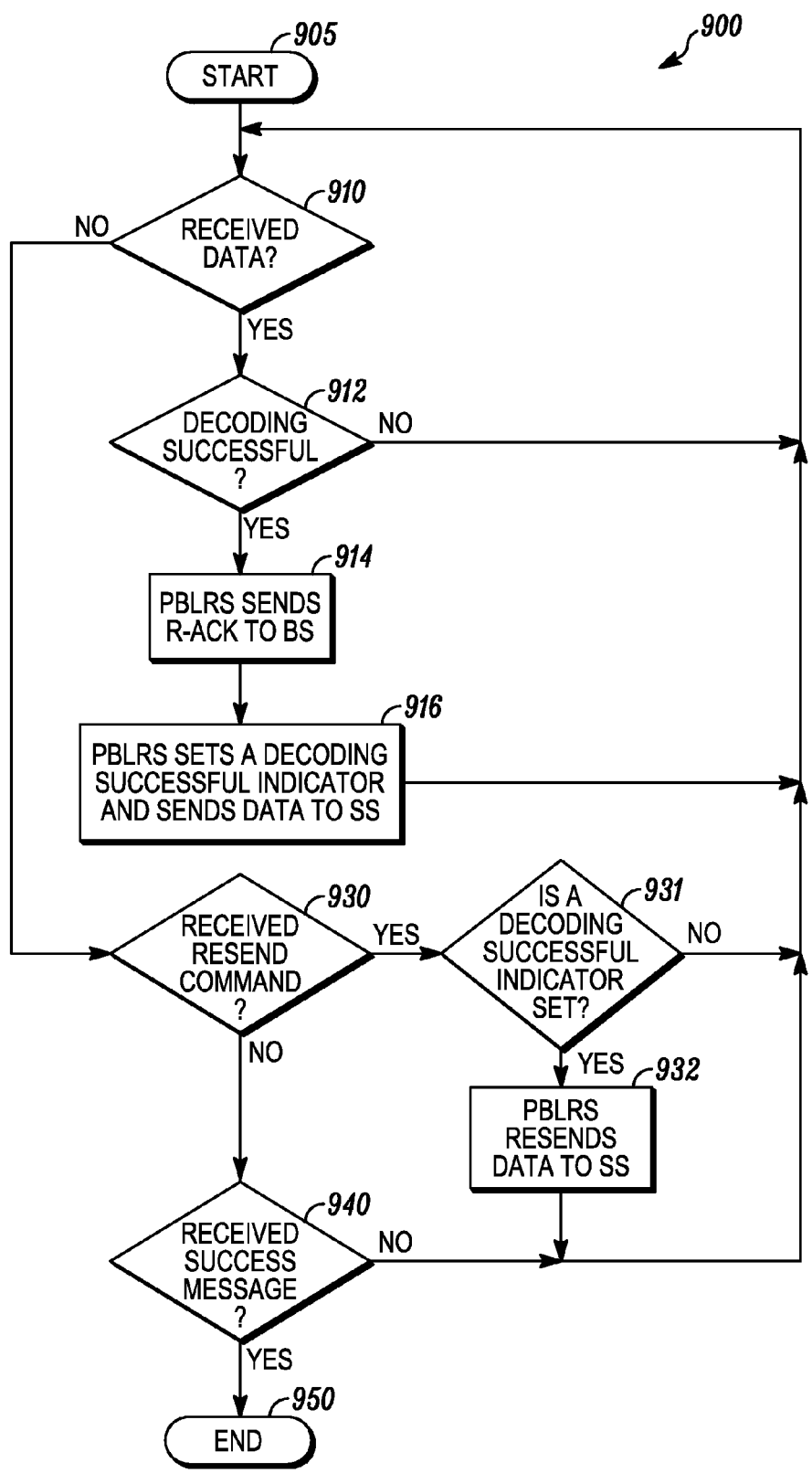
FIG. 9 is flow chart illustrating a method performed at a primary back-linked relay station during an ARQ method in accordance with some embodiments.

FIG. 9 is flow chart illustrating a method 900 performed at a primary back-linked relay station (PBLRS) 415-2 during an ARQ method in accordance with some embodiments.

Method 900 starts at step 905. At step 910, the primary back-linked relay station (PBLRS) 415-2 determines if it received a new data unit from the base station (BS) 405, and if so, the method 900 proceeds to step 912. If not, then the method 900 proceeds to step 930.

At step 912, the primary back-linked relay station (PBLRS) 415-2 determines if it can successfully process (e.g., decode), and if so, the method 900 proceeds to step 914. If not, then the method 900 loops back to step 910.

At step 914, the primary back-linked relay station (PBLRS) 415-2 sends a R-ACK message to the base station (BS) 405 to acknowledge that it could successfully process the data unit. The method 900 then proceeds to step 916. At step 916, the primary back-linked relay station (PBLRS) 415-2 sets an indicator that indicates that the primary back-linked relay station (PBLRS) 415-2 has successfully decoded the data unit and relays the data unit to the subscriber station (SS) 410, and the method 900 then loops back to step 910.

At step 930, the primary back-linked relay station (PBLRS) 415-2 determines if it received a resend command message was received from the base station (BS) 405 that indicates that the data unit is to be resent by the primary back-linked relay station (PBLRS) 415-2. If the primary back-linked relay station (PBLRS) 415-2 did not receive a resend command message from the base station (BS) 405, then the method 900 proceeds to step 940. If the primary back-linked relay station (PBLRS) 415-2 did receive a resend command message from the base station (BS) 405, the method 900 proceeds to step 931, where the primary back-linked relay station (PBLRS) 415-2 determines whether an indicator is set at the primary back-linked relay station (PBLRS) 415-2 that indicates that the primary back-linked relay station (PBLRS) 415-2 has successfully decoded the data unit. If not, then the method 900 loops back to step 910. If so, the method 900 proceeds to step 932.

At step 932, the primary back-linked relay station (PBLRS) 415-2 resends data unit to the subscriber station (SS) 410. The method 900 then loops back to step 910.

At step 940, the primary back-linked relay station (PBLRS) 415-2 determines if it received a success message from the base station confirming that the data unit was successfully transmitted to and received by the subscriber station (SS) 410. If so, the primary back-linked relay station (PBLRS) 415-2 is finished sending this data unit to the subscriber station (SS) 410 and the method ends at step 950. If not, then the method 900 loops back to step 910.

Figure 10:
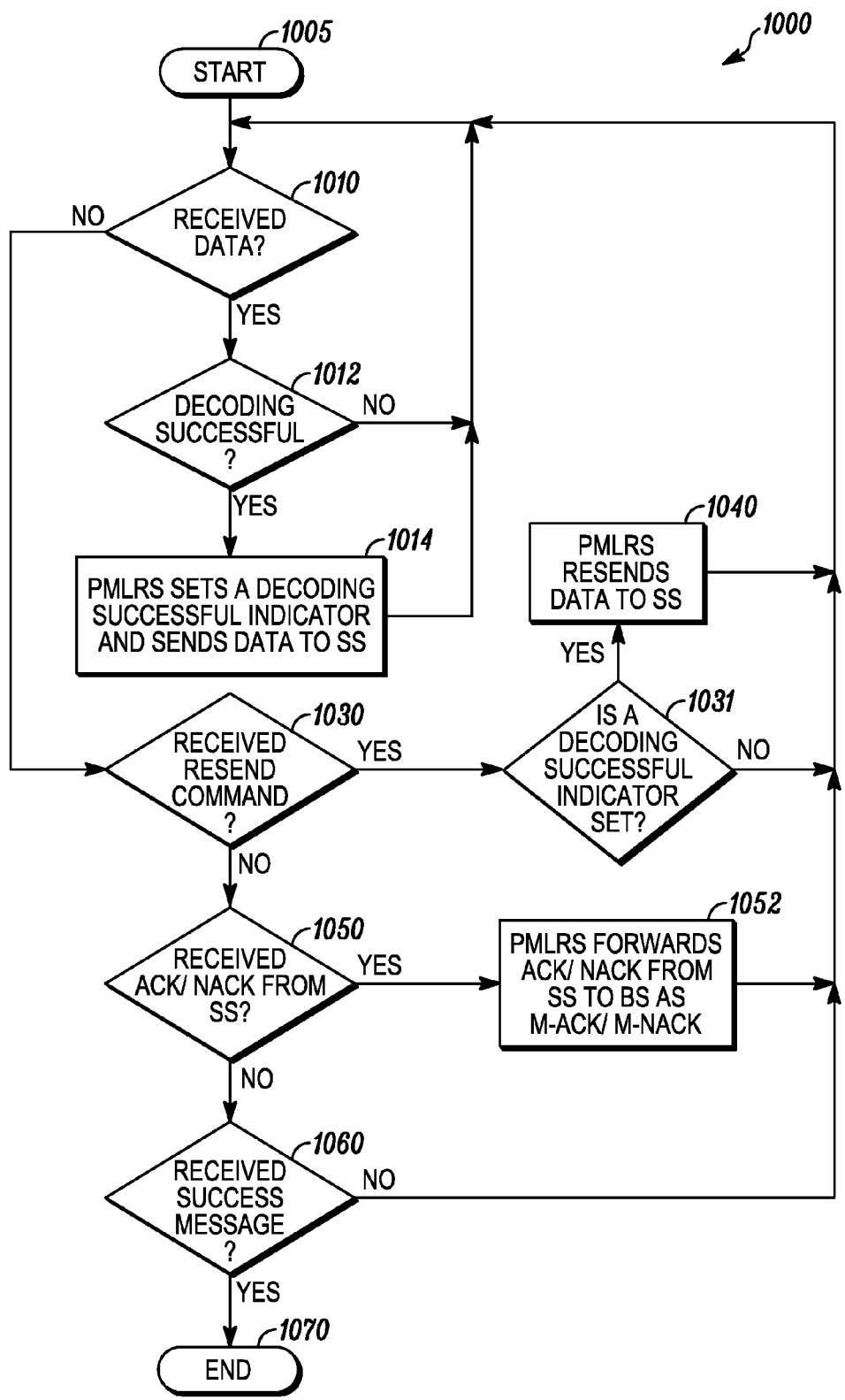
FIG. 10 is flow chart illustrating a method performed at a primary mean-linked relay station during an ARQ method in accordance with some embodiments.

FIG. 10 is flow chart illustrating a method 1000 performed at a primary mean-linked relay station (PMLRS) 415-3 during an ARQ method in accordance with some embodiments.

Method 1000 starts at step 1005. At step 1010, the primary mean-linked relay station (PMLRS) 415-3 determines if it received a new data unit from the base station (BS) 405, and if so, the method 1000 proceeds to step 1012. If not, then the method 1000 proceeds to step 1030.

At step 1012, the primary mean-linked relay station (PMLRS) 415-3 determines if it can successfully process (e.g., decode) this data unit, and if so, the method 1000 proceeds to step 1014. If not, then the method 1000 loops back to step 1010.

At step 1014, the primary mean-linked relay station (PMLRS) 415-3 sets an indicator that indicates that the primary mean-linked relay station (PMLRS) 415-3 has successfully decoded the data unit and sends the data unit to the subscriber station (SS) 410. The method 1000 then loops back to step 1010.

At step 1030, the primary mean-linked relay station (PMLRS) 415-3 determines if it received a resend command message from the base station (BS) 405 that indicates that the primary mean-linked relay station (PMLRS) 415-3 is to resend the data unit to the subscriber station (SS) 410. If the primary mean-linked relay station (PMLRS) 415-3 did not receive a resend command message from the base station (BS) 405, then the method 1000 proceeds to step 1050. If the primary mean-linked relay station (PMLRS) 415-3 did receive a resend command message from the base station (BS) 405, the method 1000 proceeds to step 1031, where the primary mean-linked relay station (PMLRS) 415-3 determines whether an indicator is set at the primary mean-linked relay station (PMLRS) 415-3 that indicates that the primary mean-linked relay station (PMLRS) 415-3 has successfully decoded the data unit. If not, then the method 1000 loops back to step 1010. If so, the method 1000 proceeds to step 1040.

At step 1040, the primary mean-linked relay station (PMLRS) 415-3 resends the data unit to the subscriber station (SS) 410, and the method 1000 then loops back to step 1010.

At step 1050, the primary mean-linked relay station (PMLRS) 415-3 determines if it received ACK/NACK from the subscriber station (SS) 410, and if so, the method 1000 proceeds to step 1052. If not, then the method 1000 proceeds to step 1060.

At step 1052, the primary mean-linked relay station (PMLRS) 415-3 relays received ACK/NACK that it received from the subscriber station (SS) 410 to the base station (BS) 405. To distinguish between the ACK/NACK sent from the subscriber station (SS) 410, the ACK or NACK sent from the primary mean-linked relay station (PMLRS) 415-3 to the base station (BS) 405 is renamed M-ACK and M-NACK, respectively. The method 1000 then loops back to step 1010.

At step 1060, the primary mean-linked relay station (PMLRS) 415-3 determines if it received a success message from the base station (BS) 405 confirming that the data unit was successfully transmitted to and received by the subscriber station (SS) 410. If so, the primary mean-linked relay station (PMLRS) 415-3 is finished sending this data unit to the subscriber station (SS) 410 and the method 1000 ends at step 1070. If not, then the method 1000 loops back to step 1010.

Figure 11:
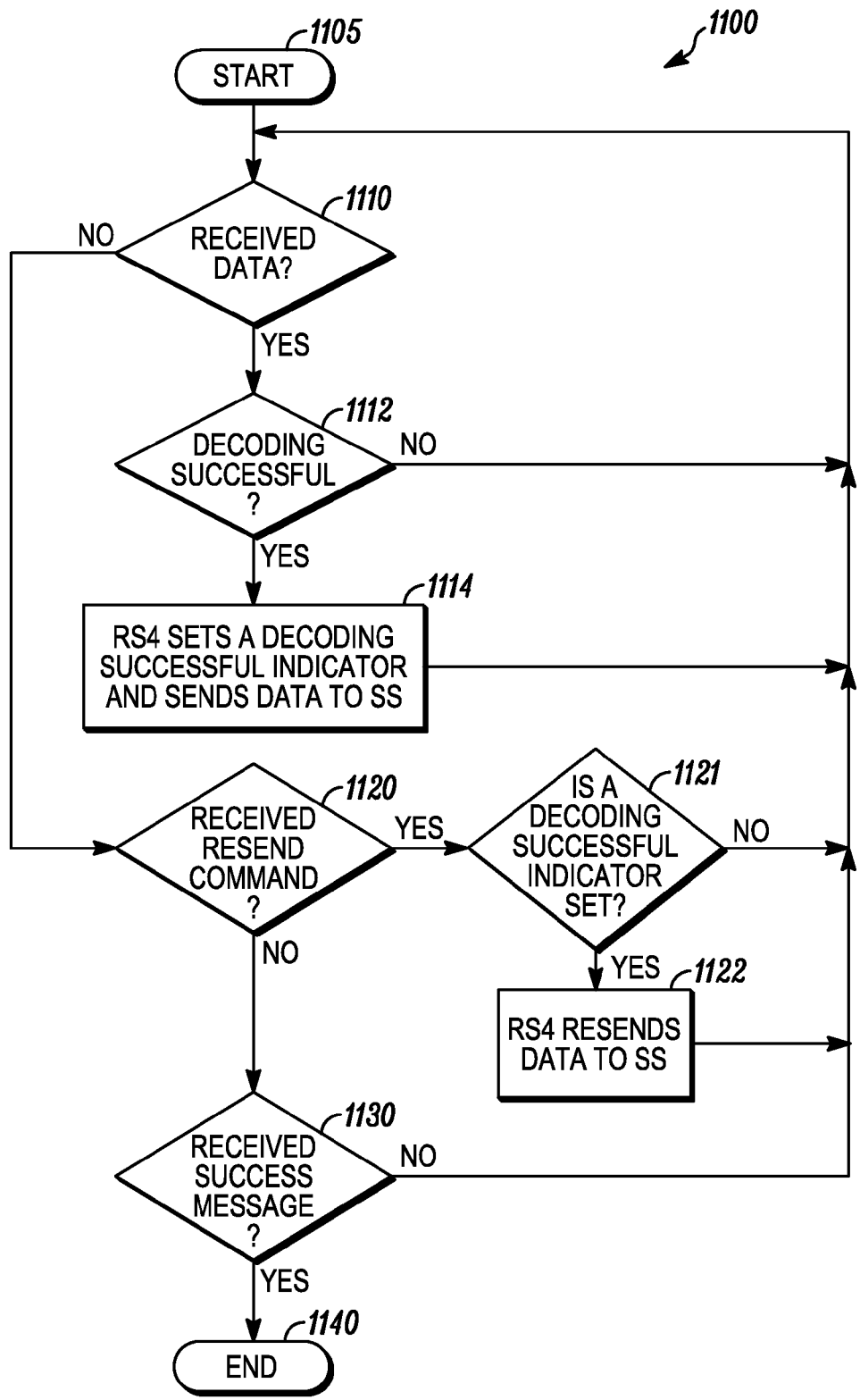
FIG. 11 is flow chart illustrating a method performed at a relay station during an ARQ method in accordance with some embodiments.

FIG. 11 is flow chart illustrating a method 1100 performed at a relay station (RS4) 415-4 during an ARQ method in accordance with some embodiments. Method 1100 is performed by relays stations in the MCG, including relay station (RS4) 415-4, that are not designated as being one of a primary front-linked relay station (PFLRS), a primary back-linked relay station (PBLRS), and a primary mean-linked relay station (PMLRS).

Method 1100 starts at step 1105. At step 1110, the non-designated relay station (RS4) 415-4 determines if it received a new data unit from the base station (BS) 405, and if so, the method 1100 proceeds to step 1112. If not, then the method 1100 proceeds to step 1120.

At step 1112, the non-designated relay station (RS4) 415-4 determines if it can successfully process (e.g., decode) this data unit, and if so, the method 1100 proceeds to step 1114. At step 1114, the non-designated relay station (RS4) 415-4 sets an indicator that indicates that the non-designated relay station (RS4) 415-4 has successfully decoded the data unit and sends the data unit to the subscriber station (SS) 410, and the method 1100 then loops back to step 1110. If the non-designated relay station (RS4) 415-4 determines that it can not successfully process (e.g., decode) this data unit, then the method 1100 loops back to step 1110.

At step 1120, the non-designated relay station (RS4) 415-4 determines if it received a resend command message was received from the base station (BS) 405 that indicates that the data unit is to be resent by the non-designated relay station (RS4) 415-4 to the subscriber station (SS) 410. If the non-designated relay station (RS4) 415-4 did not receive a resend command message from the base station (BS) 405, then the method 1100 proceeds to step 1130. If the non-designated relay station (RS4) 415-4 did receive a resend command message from the base station (BS) 405, the method 1100 proceeds to step 1121, where the non-designated relay station (RS4) 415-4 determines whether an indicator is set at the non-designated relay station (RS4) 415-4 that indicates that the non-designated relay station (RS4) 415-4 has successfully decoded the data unit. If not, then the method 1100 loops back to step 1110. If so, the method 1100 proceeds to step 1122.

At step 1122, the non-designated relay station (RS4) 415-4 resends the data unit to the subscriber station (SS) 410, and the method 1100 then loops back to step 1110.

At step 1130, the non-designated relay station (RS4) 415-4 determines if it received a success message from the base station (BS) 405 confirming that the data unit was successfully transmitted to and received by the subscriber station (SS) 410. If so, the non-designated relay station (RS4) 415-4 is finished sending this data unit to the subscriber station (SS) 410 and the method 1100 ends at step 1140. If not, then the method 1100 loops back to step 1110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for confirming whether a data unit transmitted from a source base station was successfully relayed to a destination subscriber station via one of a plurality of relay stations in a multihop cooperative relay network, the method comprising:
   designating selected ones of a plurality of relay stations as:
      a front-linked relay station designed to only transmit a negative acknowledgement message (R-NACK) to the base station upon receiving the data unit from the base station that is unable to be decoded and not to transmit an acknowledgement message upon receiving the data unit from the base station that is able to be decoded; and a back-linked relay station designed to only transmit a acknowledgement message (R-ACK) to the base station upon receiving the data unit from the base station that is able to be decoded and not to transmit a negative acknowledgement (NACK) message to the base station upon receiving the data unit from the base station that is unable to be decoded;
   transmitting, from the base station, the data unit to a plurality of relay stations;
   determining, at the base station, whether a new negative acknowledgement (R-NACK) message was received from the front-linked relay station;
   determining, at the base station, whether the base station has ever received an acknowledgment message (R-ACK) message from the back-linked relay station when the base station receives the new negative acknowledgement (R-NACK) message from the front-linked relay station; and
   retransmitting the data unit from the base station to all relays stations in the multicast communication group when the base station determines that it has not ever received an acknowledgment message (R-ACK) message from the back-linked relay station.

2. A method according to claim 1, wherein the step of designating selected ones of a plurality of relay stations further comprises:
   designating one of a plurality of relay stations as a mean-linked relay station that is designed to retransmit an acknowledgement message (M-ACK) to the base station upon receiving an acknowledgement message (M-ACK) from the subscriber station and to retransmit a negative acknowledgement (M-NACK) message to the base station upon receiving a negative acknowledgement (M-NACK) message from the subscriber station;

and further comprising:
   determining, at the base station, whether the base station has received a new acknowledgment message (R-ACK) message from the back-linked relay station when the base station has not received a new negative acknowledgement (R-NACK) message from the front-linked relay station;
   determining, at the base station, whether the base station determines has received a new negative acknowledgment (M-NACK) message from the mean-linked relay station when the base station determines that it has not received a new acknowledgment message (R-ACK) message from the back-linked relay station;
   determining, at the base station, whether an acknowledgment message (R-ACK) message was ever received from the back-linked relay station when the base station determines that the base station has received a new negative acknowledgment (M-NACK) message from the mean-linked relay station; and
   sending a resend command message from the base station to each of the relay stations in the multicast communication group when the base station determines that an acknowledgment message (R-ACK) message was ever received from the back-linked relay station, wherein the resend command message commands the recipient relay stations to resend the data unit to the subscriber station.

3. A method according to claim 2, further comprising:
   determining, at the base station, whether the base station received an acknowledgment message (M-ACK) from the mean-linked relay station when the base station determines that the base station has not received a new negative acknowledgment (M-NACK) message from the mean-linked relay station; and
   sending a success message from the base station to all relay stations in the multicast communication group when the base station determines that the base station has received an acknowledgment message (M-ACK) from the mean-linked relay station, wherein the success message indicates to the relay stations in the multicast communication group that the data unit was successfully transmitted to the subscriber station.

4. A method according to claim 2, further comprising:
   resending the data unit from the base station to all relay stations in the multicast communication group when the base station determines that an acknowledgment message (R-ACK) message was never received from the back-linked relay station.

5. A method according to claim 2, further comprising:
   setting, at the base station, an indicator which indicates that the new acknowledgment message (R-ACK) message from the back-linked relay station was received when the base station has received the new acknowledgment message (R-ACK) message from the back-linked relay station.

6. A method according to claim 2, further comprising:
   determining, at the front-linked relay station, whether a resend command message was received from the base station that indicates that the data unit is to be resent by the front-linked relay station when the data unit was not received at the front-linked relay station; and
   determining, at the front-linked relay station, whether an indicator is set at the front-linked relay station that indicates that the front-linked relay station has successfully decoded the data unit;
   resending the data unit from the front-linked relay station to the subscriber station when the resend command message was received from at the front-linked relay station and the indicator that indicates that the front-linked relay station has successfully decoded the data unit.

7. A method according to claim 6, further comprising:
determining, at the front-linked relay station, whether the success message was received from the base station, wherein the success message indicates that the data unit was successfully transmitted to the subscriber station.

8. A method according to claim 6, further comprising:
determining, at the front-linked relay station, whether a data unit was received from the base station;
determining, at the front-linked relay station, whether the front-linked relay station was able to decode the data unit;
setting, at the front-linked relay station, an indicator that indicates that the front-linked relay station has successfully decoded the data unit;
sending a negative acknowledgment (R-NACK) message from the front-linked relay station to the base station to indicate that the front-linked relay station could not decode the data unit; and
relaying the data unit from the front-linked relay station to the subscriber station when the front-linked relay station was able to decode the data unit received at the front-linked relay station.

9. A method according to claim 2, further comprising:
determining, at the back-linked relay station, whether a resend command message was received from the base station that indicates that the data unit is to be resent by the back-linked relay station when the data unit was not received at the back-linked relay station;
determining, at the back-linked relay station, whether an indicator is set at the back-linked relay station that indicates that the back-linked relay station has successfully decoded the data unit; and
resending the data unit from the back-linked relay station to the subscriber station when the resend command message was received at the back-linked relay station and the indicator that indicates that the back-linked relay station has successfully decoded the data unit.

10. A method according to claim 9, further comprising:
determining, at the back-linked relay station, whether the success message was received from the base station when the resend command message was not received at the back-linked relay station, wherein the success message indicates that the data unit was successfully transmitted to the subscriber station.

11. A method according to claim 9, further comprising:
determining, at the back-linked relay station, whether a data unit was received from the base station;
determining, at the back-linked relay station, whether the back-linked relay station was able to decode the data unit;
sending an acknowledgment (R-ACK) message from the back-linked relay station to the base station to indicate that the back-linked relay station was able to decode the data unit;
setting, at the back-linked relay station, an indicator that indicates that the back-linked relay station has successfully decoded the data unit; and
relaying the data unit from the back-linked relay station to the subscriber station when the back-linked relay station was able to decode the data unit received at the back-linked relay station.

12. A method according to claim 2, further comprising:
determining, at the mean-linked relay station, whether a resend command message was received from the base station that indicates that the data unit is to be resent by the mean-linked relay station when the data unit was not received at the mean-linked relay station;
determining, at the mean-linked relay station, whether an indicator is set at the mean-linked relay station that indicates that the mean-linked relay station has successfully decoded the data unit; and
resending the data unit from the mean-linked relay station to the subscriber station when the resend command message was received from at the mean-linked relay station and the indicator that indicates that the mean-linked relay station has successfully decoded the data unit.

13. A method according to claim 12, further comprising:
determining, at the mean-linked relay station, whether the success message was received from the base station when the mean-linked relay station determines that at least one of an acknowledgement (ACK) message and a negative acknowledgment (NACK) message was not received from the subscriber station at the mean-linked relay station, wherein the success message indicates that the data unit was successfully transmitted to the subscriber station.

14. A method according to claim 12, further comprising:
determining, at the mean-linked relay station, whether one of an acknowledgement (ACK) message and a negative acknowledgment (NACK) message was received from the subscriber station when the resend command message was not received at the mean-linked relay station; and
forwarding, from the mean-linked relay station to the base station, the one of an acknowledgement (ACK) message and a negative acknowledgment (NACK) message that was received from the subscriber station.

15. A method according to claim 12, further comprising:
determining, at the mean-linked relay station, whether a data unit was received from the base station;
determining, at the mean-linked relay station, whether the mean-linked relay station was able to decode the data unit;
setting, at the mean-linked relay station, an indicator that indicates that the mean-linked relay station has successfully decoded the data unit; and
relaying the data unit from the mean-linked relay station to the subscriber station when the mean-linked relay station was able to decode the data unit.

16. A method according to claim 2, wherein any relay station that is not designated as being one of the front-linked relay station, the back-linked relay station, and the mean-linked relay station is a non-designated relay station, and further comprising:
determining, at the non-designated relay station, whether a data unit was received from the base station;
determining, at the non-designated relay station, whether the non-designated relay station was able to decode the data unit;
setting, at the non-designated relay station, an indicator that indicates that the non-designated relay station has successfully decoded the data unit;
relaying the data unit from the non-designated relay station to the subscriber station when the non-designated relay station was able to decode the data unit;
determining, at the non-designated relay station, whether a resend command message was received from the base station that indicates that the data unit is to be resent by the non-designated relay station when the data unit was not received at the non-designated relay station;
determining, at the non-designated relay station, whether an indicator is set in at the non-designated relay station that indicates that the non-designated relay station has successfully decoded the data unit;

resending the data unit from the non-designated relay station to the subscriber station when the resend command message was received from the non-designated relay station and the indicator that indicates that the non-designated relay station has successfully decoded the data unit; and determining, at the non-designated relay station, whether the success message was received from the base station when the non-designated relay station determines that the resend command message was not received at the non-designated relay station, wherein the success message indicates that the data unit was successfully transmitted to the subscriber station.

17. A method according to claim 1, wherein each relay station communicates with the base station over a front link between that relay station and the base station, and wherein each relay station communicates with the subscriber station over a back link between that relay station and the subscriber station, and wherein the step of designating selected ones of a plurality of relay stations, comprises:

measuring, at each of the plurality of relay stations, a back link metric of a back link to the subscriber station, determining whether the measured back link metric is above a first threshold (T1), and reporting the measured back link metric to the base station when the measured back link metric is above the first threshold (T1);

receiving, at the base station, the measured back link metrics from each of the relay station for which the measured back link metric exceeds the first threshold (T1) and adding those relay stations to a multicast candidate group (MCG);

measuring, at the base station, a front link metric of a front link to each relay station in the multicast candidate group (MCG), determining which of the measured front link metrics are below a second threshold (T2), and removing any relay stations having measured front link metrics below the second threshold (T2) from the MCG; and determining, at the base station based on the measured back link metrics and the measured front link metrics for each relay station that remains in the MCG, selected ones of the relay stations that remain in the MCG that are to be designated as the front-linked relay station, the back-linked relay station.

18. A method according to claim 17, wherein the step of determining, at the base station based on the measured back link metrics and the measured front link metrics for each relay station that remains in the MCG, selected ones of the relay stations that remain in the MCG that are to be designated as the front-linked relay station, the back-linked relay station, comprises:

determining, at the base station, which one of the relay stations remaining in the multicast communication group has the highest measured front link metric, which one of the relay stations remaining in the multicast communication group has the highest measured back link metric, and which one of the relay stations remaining in the multicast communication group has the highest average of the measured front link metric and the measured back link metric; and designating, at the base station, the one of the relay stations having the highest measured front link metric as the front-linked relay station, the one of the relay stations having the highest measured back link metric as the back-linked relay station, and the one of the relay stations having the highest average of the measured front link metric and the measured back link metric as the mean-linked relay station.

19. A method according to claim 17, wherein the each of the front link metrics comprise a front link capacity metric.

20. A method according to claim 17, wherein the each of the front link metrics comprise a front link quality metric.

21. A method according to claim 17, wherein the each of the front link metrics comprise a combination of a front link capacity metric and a front link quality metric.

22. A method according to claim 17, wherein the each of the back link metrics comprise a back link capacity metric.

23. A method according to claim 17, wherein the each of the back link metrics comprise a back link quality metric.

24. A method according to claim 17, wherein the each of the back link metrics comprise a combination of a back link capacity metric and a back link quality metric.

25. A method according to claim 1, wherein each relay station communicates with the base station over a front link between that relay station and the base station, and wherein each relay station communicates with the subscriber station over a back link between that relay station and the subscriber station, and wherein the step of designating selected ones of a plurality of relay stations, comprises:

determining a first group of relay stations having front link metrics that exceed a first threshold, and pseudo-randomly designating a selected one of the first group of relay stations as the front-linked relay station; and determining a second group of relay stations having back link metrics that exceed a second threshold, and pseudo-randomly designating a selected one of the second group of relay stations as the back-linked relay station.

26. A method according to claim 25, further comprising:

pseudo-randomly designating a selected one of the first group of relay stations and the second group of relay stations as a mean-linked relay station.

27. A method according to claim 25, wherein the each of the front link metrics comprise a front link capacity metric.

28. A method according to claim 25, wherein the each of the front link metrics comprise a front link quality metric.

29. A method according to claim 25, wherein the each of the front link metrics comprise a combination of a front link capacity metric and a front link quality metric.

30. A method according to claim 25, wherein the each of the back link metrics comprise a back link capacity metric.

31. A method according to claim 25, wherein the each of the back link metrics comprise a back link quality metric.

32. A method according to claim 25, wherein the each of the back link metrics comprise a combination of a back link capacity metric and a back link quality metric.

33. A method according to claim 1, wherein each relay station communicates with the base station over a front link between that relay station and the base station, and wherein each relay station communicates with the subscriber station over a back link between that relay station and the subscriber station, and wherein the step of designating selected ones of a plurality of relay stations, comprises:

providing the base station with a front link metric associated with each of the relay stations;

determining, at the base station based on the front link metrics associated with each of the relay stations, which relay station has a highest front link metric with the base station;

designating the one of the relay stations that has the highest front link metric with the base station as the front-linked relay station; and providing the base station with a back link metric associated with each of the relay stations;

determining, at the base station based on the back link metrics associated with each of the relay stations, which relay station has a highest back link metric with the subscriber station; and designating the one of the relay stations that has the highest back link metric as the back-linked relay station.

34. A method according to claim 33, further comprising:

determining, at the base station, a mean link metric for each of the relay stations, wherein the mean link metric for each relay station is determined based on a front link metric associated with that relay station and a back link metric associated with that relay station; and determining, at the base station, which relay station has a highest mean link metric; and designating the one of the relay stations that has the highest mean link metric as a mean-linked relay station.

* * * * *